(12) United States Patent
Caruthers et al.

(10) Patent No.: US 8,279,975 B2
(45) Date of Patent: Oct. 2, 2012

(54) METHOD TO SUPPRESS UNDESIRED SIDEBANDS IN A RECEIVER

(75) Inventors: Roger W. Caruthers, Des Plaines, IL (US); Aaron S. Madsen, Mount Prospect, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 346 days.

(21) Appl. No.: 12/637,168

(22) Filed: Dec. 14, 2009

(65) Prior Publication Data

US 2011/0143701 A1    Jun. 16, 2011

(51) Int. Cl.
*H03K 9/00* (2006.01)
(52) U.S. Cl. ........................................ 375/316; 375/329
(58) Field of Classification Search .................. 455/127, 455/136, 138, 232.1, 240.1, 250.1, 251.1, 455/127.1; 375/332, 296, 362, 308, 316, 375/329; 329/349
See application file for complete search history.

(56) References Cited

U.S. PATENT DOCUMENTS

| | | | |
|---|---|---|---|
| 4,489,392 A | 12/1984 | Lewis | |
| 5,705,949 A | 1/1998 | Alelyunas | |
| 6,330,290 B1 | 12/2001 | Glas | |
| 6,421,397 B1 * | 7/2002 | McVey | 375/308 |
| 6,421,398 B1 * | 7/2002 | McVey | 375/308 |
| 6,574,286 B2 * | 6/2003 | McVey | 375/308 |
| 7,010,278 B2 | 3/2006 | Kirschenmann et al. | |
| 7,061,997 B1 * | 6/2006 | Eberlein et al. | 375/332 |
| 7,130,359 B2 * | 10/2006 | Rahman | 375/316 |
| 7,382,834 B2 * | 6/2008 | Dawson et al. | 375/296 |
| 7,456,683 B2 * | 11/2008 | Takano et al. | 329/349 |

OTHER PUBLICATIONS

Apostolos Georgiadis, "Gain, Phase Imbalance, and Phase Noise Effects on Error Vector Magnitude", IEEE Transactions on Vehicular Technology, vol. 53, No. 2, Mar. 2004.
Xing, et al., "Frequency Offset and I/Q Imbalance Compensation for Direct-Conversion Receivers", IEEE Transactions on Wireless Communications, vol. 4, No. 2, Mar. 2005.
Cetin, et al., Adaptive Compensation of Analog Front-End I/Q Mismatches in Digital Receivers, IEEE International Symposium on Circuits and Systems (ISCAS 2001), pp. 370-373.

* cited by examiner

*Primary Examiner* — Sonny Trinh
(74) *Attorney, Agent, or Firm* — Anthony P. Curtis; Daniel R. Bestor

(57) ABSTRACT

A receiver and method of correcting for amplitude and phase errors in a received complex signal are provided. After separating and processing the complex signal into its I and Q component signals, the magnitude of each of the I and Q signals is obtained. The magnitudes are averaged over a predetermined time period and the average used to correct the amplitude of the I and Q signals. Each amplitude-corrected signal is then rotated by 45° and the average magnitude of the rotated signal determined. The amplitude of the rotated signal is then corrected to provide resultant I and Q signals, which are orthogonal to each other.

18 Claims, 7 Drawing Sheets

METHOD TO SUPPRESS UNDESIRED SIDEBANDS IN A RECEIVER

TECHNICAL FIELD

The present application relates generally to receivers and more particularly to a method to suppress undesired sidebands in a receiver such as a direct conversion receiver.

BACKGROUND

Existing wireless communications networks, such as a wireless Local Area Networks (LANs), contain a multitude of wireless communication devices (e.g., cellular telephones, personal digital assistants, laptop computers) located within a relatively small geographical area and that simultaneously communicate with the same wireless access point. The devices operate on Radio Frequency (RF) channels, the physical resources over which information is passed between the devices. Generally, an RF signal of suitable frequency is modulated by in-phase (I) and quadrature-phase (Q) signals of the same frequency but that are 90° out of phase with each other, thereby generating modulated RF signals. The modulated RF signals are individually amplified, combined and transmitted to a radio receiver on a selected RF channel after having been up-converted to the desired transmission frequency.

When this summed RF signal is received by a receiver, it is separated into its I and Q components, which are then processed by the receiver. This processing may include down-converting the I and Q components with a local oscillator (LO) signal to produce an output signal which is subsequently digitally sampled by an Analog-to-Digital Converter (ADC). The receiver is a Direct Conversion Receiver (DCR) if the LO frequency is approximately equal to the frequency of the received RF signal, and the output signal produced by mixing the RF and the LO signals is a baseband signal (approximately 0 Hz). The receiver is a dual conversion receiver if the LO is offset from the desired received RF signal by an offset frequency typically referred to as an Intermediate Frequency (IF). Dual conversion receivers incorporate additional IF stages to process the IF signal prior to being digitally sampled by the ADC.

Direct conversion receiver (DCR) architectures are generally desirable because they eliminate additional components of intermediate frequency stages, reducing the complexity and cost of the receiver. However, DCRs, especially wideband DCRs, also suffer from problems that are more easily mitigated by using other types of receivers. For example, although it is desired to provide equal individual gains and a 90° phase shift between the I and Q components, in practice, gain imbalance and phase errors exist due to differences between the electronic components in the different signal paths (e.g., filters with mismatched frequency responses) as well as phase errors in due to an imperfectly balanced local oscillator. Phase imbalances lead to the creation of a sideband. These sidebands are lower level images or replicas of the desired signal that are mirrored around the 0 Hz component of the baseband signal. These sidebands are unwanted signals that create an error floor that reduces the bit error rate (BER) performance of the receiver. Moreover, the imbalances may increase in subsequent amplifiers and filters as such the response of these components vary with frequency.

The existence of a substantial sideband thus leads to a significant degradation in system performance. To combat this, countermeasures such as complicated algorithms have been taken in DCRs by attempting to balance the gains and reduce the phase offset. To date, however, sideband suppression in DCRs remains problematic; in some cases being less than 20 dB for a phase error of a few degrees while 60-80 dB is desired. It is thus desirable to improve sideband suppression in DCRs.

SUMMARY

In various embodiments, a receiver and a reception method are presented. In one embodiment, a method is presented of correcting for phase and amplitude errors in a complex signal in an electronic device. The method comprises correcting for gain imbalances between I and Q signals of the complex signal before and after rotating the I and Q signals. In an embodiment, the complex signal is rotated by 45° ($e^{\pm i\pi/4}$).

In another embodiment, an electronic device comprises a processor that is configured to correct for gain imbalances between I and Q signals of the complex signal before and after rotating the I and Q signals. In an embodiment, the processor comprises algorithmic blocks. Magnitude blocks determine magnitudes of each of the I and Q signals. Averagers average the magnitudes of the I and Q signals each by integrating an input signal over a predetermined time period and then dividing the integrated signal by the time period. A divider determines a ratio of the magnitudes of the averaged I and Q signals. Delays delay the I and Q signals until the ratio is obtained by the divider. At least one variable amplifier adjusts an amplitude of at least one of the delayed I and Q signals, a gain of the at least one variable amplifier controlled by the ratio. A rotator rotates the output from the at least one variable amplifier by 45° and, if only one variable amplifier adjusts the amplitude of the delayed I and Q signals, a delayed signal unamplified signal, to form rotated I and Q signals. Second magnitude blocks determine magnitudes of the rotated I and Q signals. Second averagers average the magnitudes of the rotated I and Q signals. A second divider determines a ratio of the magnitudes of the rotated I and Q signals. Second delays delay the rotated I and Q signals until the ratio is obtained by the second divider. At least one second variable amplifier adjust an amplitude of at least one of the delayed rotated I and Q signals and whose output is controlled by the ratio obtained from the second divider.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present application.

Figure 1:
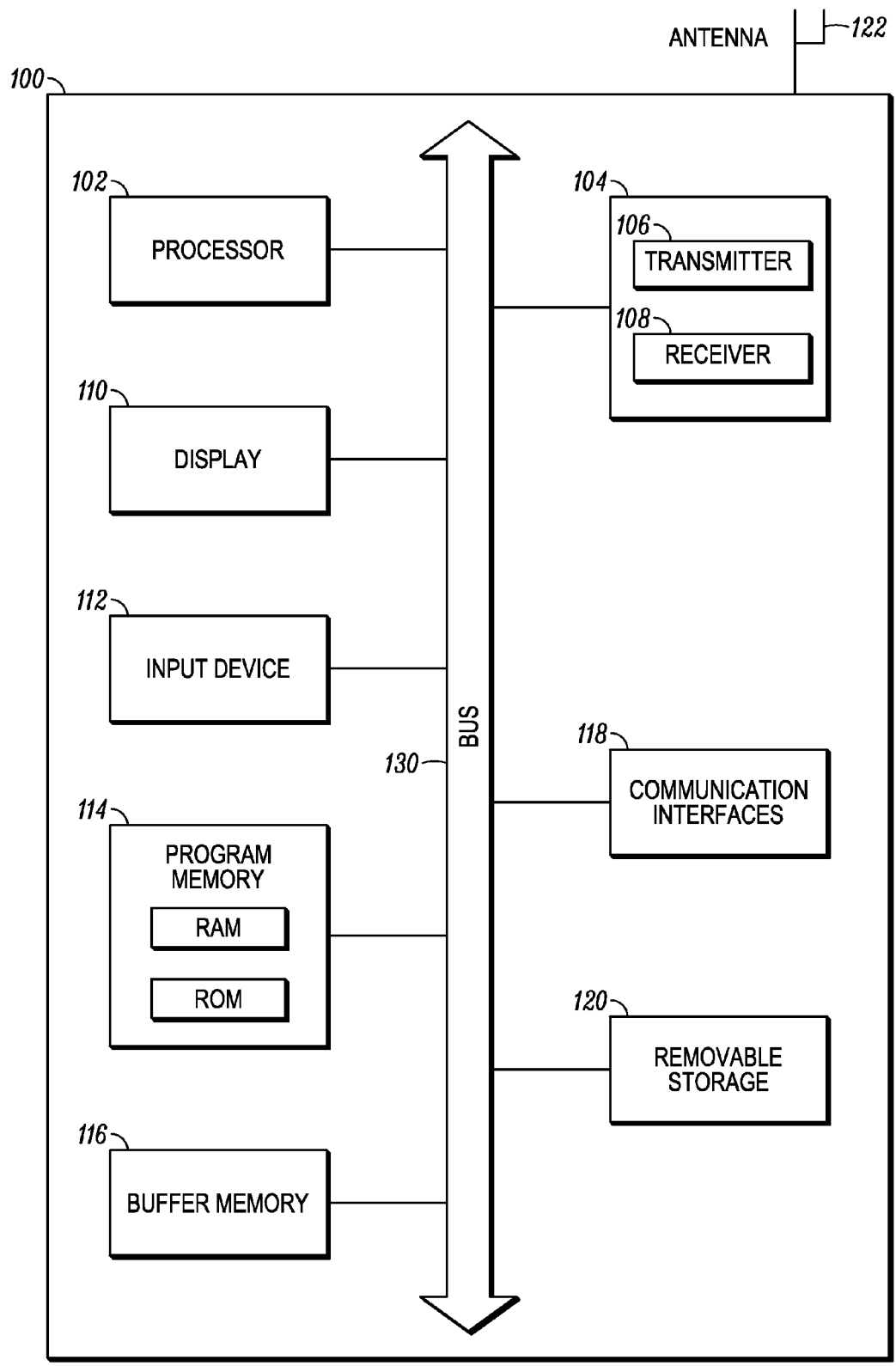
FIG. 1 illustrates a block diagram of one embodiment of a wireless communication device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the embodiments, it should be observed that the embodiments reside primarily in combinations of method steps and apparatus components related to error correction in a receiver. Accordingly, the apparatus components and method steps have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

In the embodiments described, amplitude and phase errors introduced to a received complex (IQ) signal due to inhomogeneities between the I and Q signal paths as well as non-idealities in creation of the modulating signals at the receiver. To correct the amplitude and phase errors, the averaged signal magnitudes are used to correct the amplitude of the received signal before the signal is rotated by $e^{\pm j\pi/4}$. The amplitude of the rotated signal is then corrected using the averaged signal magnitudes of the rotated signal to produce corrected I and Q signals.

Turning to the figures, FIG. 1 illustrates a block diagram of an exemplary communication device 100. As shown, the communication device 100 is a handheld mobile device such as a Professional Mobile radio (PMR), cellular telephone, personal digital assistant (PDA), push-to-talk (PTT) radio, or wireless laptop computer, however, in other embodiments the communication device can be vehicle mounted or fixed to a particular geographic location, such as a base station. The communication device 100 can function as either a transmitter or receiver.

The device 100 contains, among other components, a processor 102, a transceiver 104 including transmitter circuitry 106 and receiver circuitry 108, an antenna 122, a display 110, an input device(s) 112, a program memory 114 for storing operating instructions that are executed by the processor 102, a buffer memory 116, one or more communication interfaces 118, and a removable storage 120, all connected by a bus 130. Although not shown, the device 100 also preferably includes an antenna switch, duplexer, circulator, or other highly isolative means for intermittently providing information packets from the transmitter circuitry 106 to the antenna 122 and from the antenna 122 to the receiver circuitry 108. The device 100 is preferably an integrated unit containing at least all the elements depicted in FIG. 1, as well as any other elements necessary for the device 100 to perform its particular electronic function. Alternatively, the device 100 may comprise a collection of appropriately interconnected units or devices, wherein such units or devices perform functions that are equivalent to the functions performed by the elements of the device 100. For example, the device 100 may comprise a laptop computer with a Wireless Local Area Network (WLAN) card.

The processor 102 preferably includes one or more microprocessors, microcontrollers, DSPs, state machines, logic circuitry, or any other device or devices that process information based on operational or programming instructions. Such operational or programming instructions are preferably stored in the program memory 114. The program memory 114 may be an IC memory chip containing any form of random access memory (RAM) or read only memory (ROM), a floppy disk, a compact disk (CD) ROM, a hard disk drive, a digital video disk (DVD), a flash memory card or any other medium for storing digital information. One of ordinary skill in the art will recognize that when the processor 102 has one or more of its functions performed by a state machine or logic circuitry, the memory 114 containing the corresponding operational instructions may be embedded within the state machine or logic circuitry. The operations performed by the processor 102 and the rest of the device 100 are described in detail below.

The transmitter circuitry 106 and the receiver circuitry 108 enable the device 100 to communicate information packets to and acquire information packets from the other nodes. In this regard, the transmitter circuitry 106 and the receiver circuitry 108 include appropriate, conventional circuitry to enable digital or analog transmissions over a wireless communication channel. The transmitter circuitry 106 and the receiver circuitry 108 are designed to operate over an ad hoc networking air interface (e.g., BLUETOOTH, 802.11 WLAN, Wi-Fi, WiMAX, . . . , etc.).

The implementations of the transmitter circuitry 106 and the receiver circuitry 108 depend on the implementation of the device 100. For example, the transmitter circuitry 106 and the receiver circuitry 108 may be implemented as an appropriate wireless modem, or as conventional transmitting and receiving components of two-way wireless communication devices. In the event that the transmitter circuitry 106 and the receiver circuitry 108 are implemented as a wireless modem, the modem can be internal to the device 100 or insertable into the device 100 (e.g., embodied in a wireless RF modem implemented on a Personal Computer Memory Card International Association (PCMCIA) card). For a wireless communication device, the transmitter circuitry 106 and the receiver circuitry 108 are preferably implemented as part of the wireless device hardware and software architecture in accordance with known techniques. One of ordinary skill in the art will recognize that most, if not all, of the functions of the transmitter circuitry 106 and/or the receiver circuitry 108 may be implemented in a processor, such as the processor 102. However, the processor 102, the transmitter circuitry 106, and the receiver circuitry 108 have been artificially partitioned herein to facilitate a better understanding.

The receiver circuitry 108 is capable of receiving RF signals from at least one band and optionally more bands, if the communications with the proximate device are in a frequency band other than that of the network communications. The receiver circuitry 108 may optionally comprise a first receiver and a second receiver, or one receiver capable of receiving in two or more bandwidths. The receiver 108, depending on the mode of operation, may be attuned to receive, for example, Bluetooth or WLAN, such as 102.11, communication signals. The transceiver 104 includes at least one set of transmitter circuitry 106. The transmitter circuitry 106 may be capable of transmitting to multiple devices potentially in multiple frequency bands. The receiver circuitry 108 includes, for example, receiver front-end circuitry (effectively providing reception, filtering and intermediate or base-band frequency conversion), a signal processor (generally realized by at least one digital signal processor (DSP)) serially coupled to the front-end circuitry, a controller to calculate receive bit-error-rate (BER) or frame-error-rate (FER) or similar link-quality measurement data from recovered information via a received signal strength indication (RSSI) function, a memory to store data such as decoding/encoding functions, amplitude and phase settings to ensure a linear and stable output, and a timer to control the timing of operations, namely the transmission or reception of time-dependent signals. As shown in FIG. 1, the signal processor and controller may be provided by the processor 102 and the receiver memory may be provided in the program memory 114.

The antenna 122 comprises any known or developed structure for radiating and receiving electromagnetic energy in the frequency range containing the wireless carrier frequencies. Although not shown, the antenna 122 may be coupled to a switch that provides signal routing control of radio frequency (RF) signals in the device 100, as well as isolation between the transmitter circuitry 106 and the receiver circuitry 108. Alternatively, the switch could be replaced with a duplex filter, for frequency duplex devices as known to those skilled in the art. The buffer memory 116 may be any form of volatile memory, such as RAM, and is used for temporarily storing received information packets. The display 110 may be an LCD, OLED, or any other known display. The Input Device 112 may be one or more of: an alpha-numeric keyboard, isolated buttons, soft and/or hard keys, touch screen, jog wheel, or any other known input device.

Figure 2:
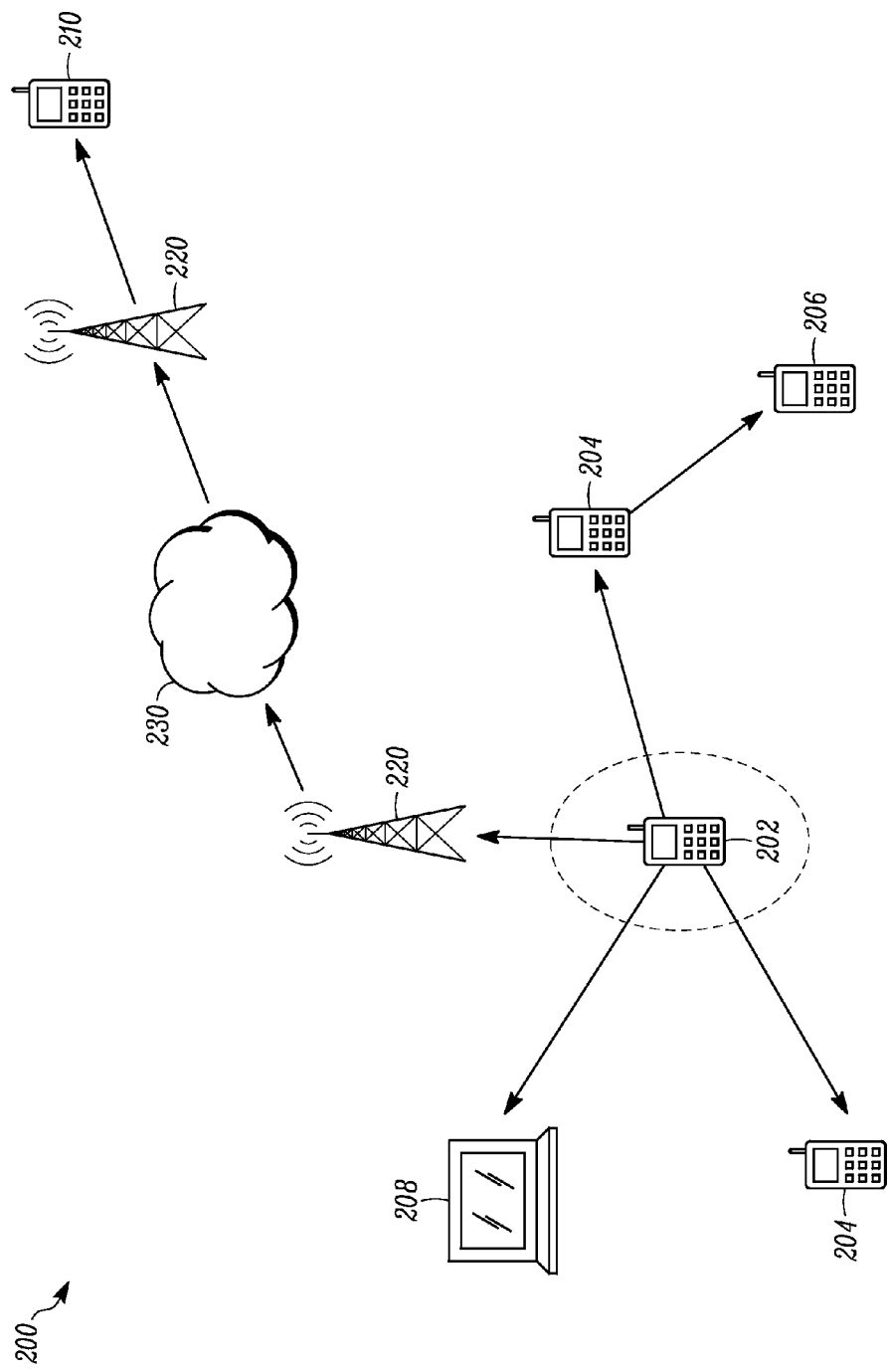
FIG. 2 illustrates an embodiment of a communication system incorporating the device of FIG. 1.

A block diagram of a system using the device of FIG. 1 is shown in FIG. 2. As shown, the system 200 contains multiple communication devices 202, 204, 206, 208, 210. One of the devices 202 transmits to at least one of the other devices 202, 204, 206, 208, 210. This communication may be direct, i.e., device-to-device, or indirect, employing base stations 220 and other infrastructure 230. The devices 202, 204, 206, 208, 210 may be the same type of device (as shown, e.g., 202, 204, 206, 210) or different (as shown, e.g., 204 and 208). As shown, when communicating in direct mode (without using the infrastructure 220, 230), the receiving devices 204, 206, 208 receive the communication either directly (204, 208) or using one of the receiving devices 204 as an intermediary to forward the data to other of the receiving devices 206.

Figure 3:
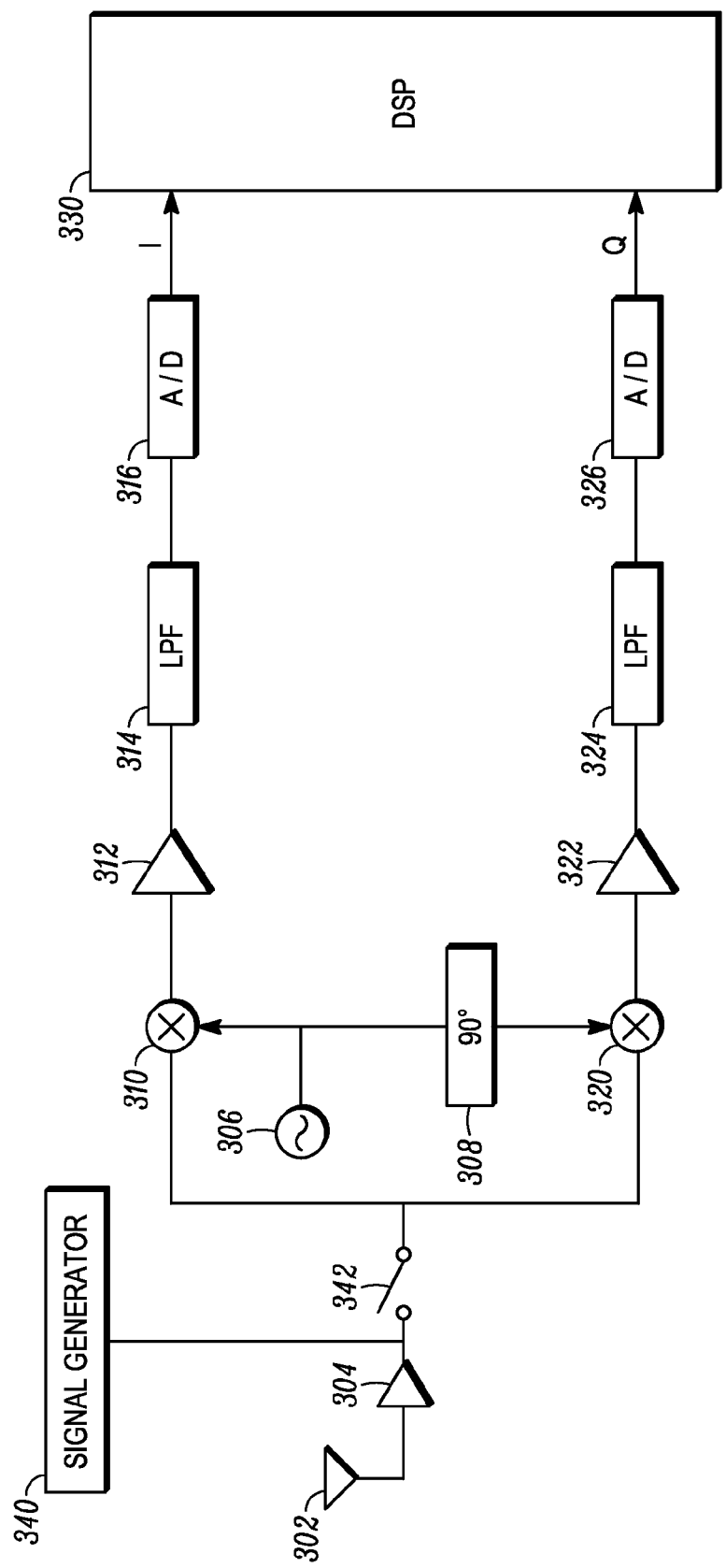
FIG. 3 illustrates an embodiment of a block diagram of a receiver of the device of FIG. 1.

FIG. 3 illustrates some of the basic blocks of the device when operating as a receiver. A signal is received by an antenna 302. The signal is amplified by a low noise amplifier 304 at the front end of the receiver before being split into two quadrature (I and Q) signal paths. A local oscillator 306 provides a modulation signal that modulates (or down mixes) the received signal from the carrier frequency down to baseband or near baseband using mixers 310, 320. Before the signal along each path is modulated, the modulating signal from the local oscillator 306 is provided to a phase shifter 308 that phase shifts by 90° the modulating signal being supplied to the mixer 320 of the Q path. After being down mixed, each of the resulting signals is supplied to respective variable amplifiers 312, 322, low pass filters 314, 324, and analog-to-digital converters 316, 326 to digitize the respective I and Q signals. The resulting digitized I and Q signals are supplied to a digital signal processor (DSP) 330 where, among other processes, errors in the I and Q signals are corrected.

In one embodiment, a switch 342 may be disposed between the antenna 302 and the mixers 310, 320, either after the low noise amplifier 304 as shown or before the low noise amplifier 342. The switch 342 switches between the signal to the mixers 310, 320 between the external signal provided to the antenna 302, and an internal signal generated by the signal generator 340 during a training session. Although not shown in FIG. 3, feedback may also be employed, e.g., via a Cartesian feedback loop, during the training session to correct for phase or amplitude errors in the received signal. In other embodiments the signal generator 340 and switch 342 may not be present, the correction described below being performed on signals that have circular symmetry over a long term average. Such signals include Additive White Gaussian Noise (AWGN), M-ary PSK, and M-ary QAM signals.

Mathematically, I(t) and Q(t) can be expressed by:

$$I(t)=\cos(\omega_0 t)\cos(\omega_{LO} t)$$

$$Q(t)=\alpha \cos(\omega_0 t)\cos(\omega_{LO} t+\phi) \qquad (1)$$

where $\omega_0$ and $\omega_{LO}$ are the carrier and local oscillator frequencies, respectively, $\phi$ is the phase mismatch and $\alpha$ is the gain mismatch between the I and Q signals. This may be rearranged using standard trigonometric identities as:

$$I(t)=\cos((\omega_0-\omega_{LO})t)$$

$$Q(t)=-\alpha \sin((\omega_0-\omega_{LO})t-\phi) \qquad (2)$$

Figures 4A, 4B, 4C:
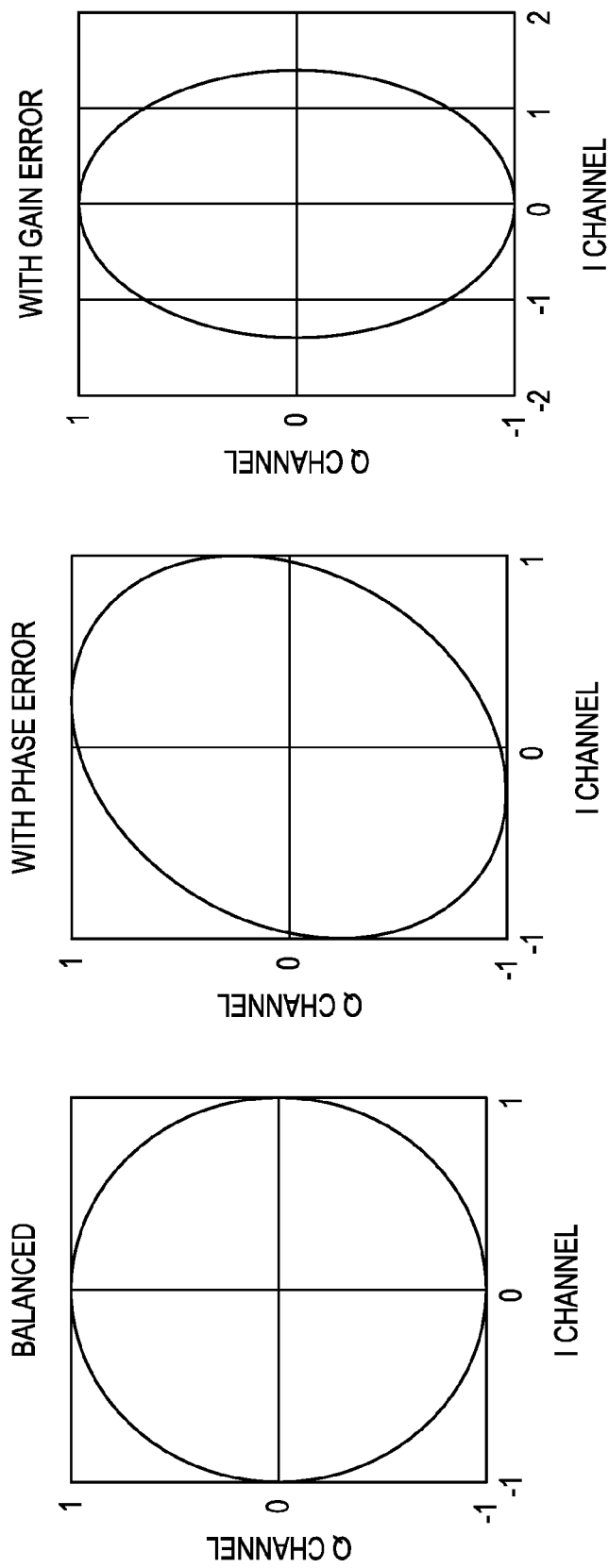
FIGS. 4A-C show balanced and unbalanced IQ signals in the IQ plane.

The effects of phase and gain imbalances, described in equation 2, are shown graphically in the I(t)/Q(t) plane diagrams of FIGS. 4A-4C. As shown, when balanced, the I and Q signals are orthogonal to each other at all times, thereby creating a circle in the IQ plane. The effect of phase imbalance, as shown in FIG. 4B, is to rotate and distort the circle so that it becomes an ellipse as the I and Q signals are no longer orthogonal at all times, i.e., a correlation exists between the I/Q signals. Gain imbalance, shown in FIG. 4C, similarly distorts the circle without rotation such that the gains of the I and Q signals are not equal but occur at the same points as in FIG. 4A.

Although pilot tones may be used to adjust the phase and gain errors, use of such procedures alone are computationally expensive and generation of the pilot tones may produce errors that lead to incorrect calibration values. Instead, the fact that I/Q signals with phase and gain errors are no longer orthogonal to each other is exploited. To correct the amplitude and phase errors, averaged magnitudes of the individual I and Q signals are used to correct the amplitude of the received signal before the signal is rotated by $e^{\pm i\pi/4}$. It can be shown that the amplitude-corrected signal forms an ellipse in the IQ plane whose major axis is aligned at an angle of $\pm \pi/4$ from the real axis. Thus, the corrected signal is rotated by an angle of $\pm \pi/4$ to align the major axis of the ellipse with the real or imaginary axis. The amplitude of the rotated signal is then again corrected in a manner similar to the first correction to scale the I and Q signals so that they become equal and orthogonal at all times, thereby distorting the ellipse back into a circle.

Figure 5:
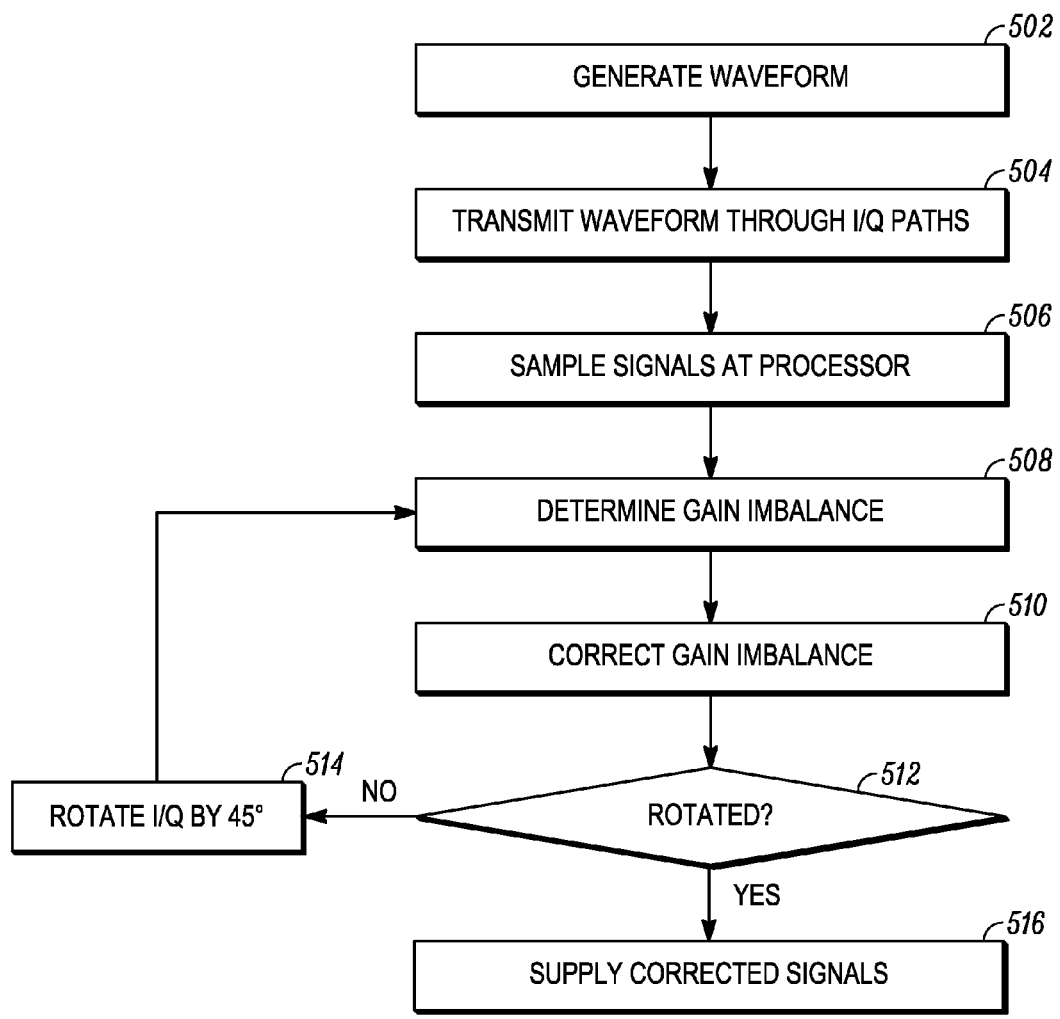
FIG. 5 illustrates an embodiment of a correction flowchart in the receiver of FIG. 3.

More specifically, as shown in the method of FIG. 5, a test waveform is generated at the modulation frequency at step 502. The test waveform has an I/Q plane in which the average amplitudes are equal in all four quadrants, such as the balanced I/Q signal shown in of FIG. 4A. As noted above, certain signals also have amplitudes that are equal in all four quadrants when averaged over a predetermined time period. Thus, if the type of signal received by the antenna of the receiver is known to be one of these signals, this received signal may be corrected in real time rather than using a training session (between times of reception by the antenna of the receiver) that employs the test waveform. Returning to FIG. 5, the test waveform is supplied through the different paths of the receiver to the DSP at step 504. The DSP detects the gain imbalance introduced by the different components along the paths at step 506 and corrects this imbalance at step 508. It is then determined at step 510 whether the waveform has been rotated by the DSP. If not, the DSP rotates the amplitude-corrected waveform by 45° at step 512 before returning to step 506, where the gain imbalance is again detected and subsequently corrected at step 508. If the waveform has been rotated by the DSP, the corrected signals are supplied as outputs at step 512.

Figure 6:
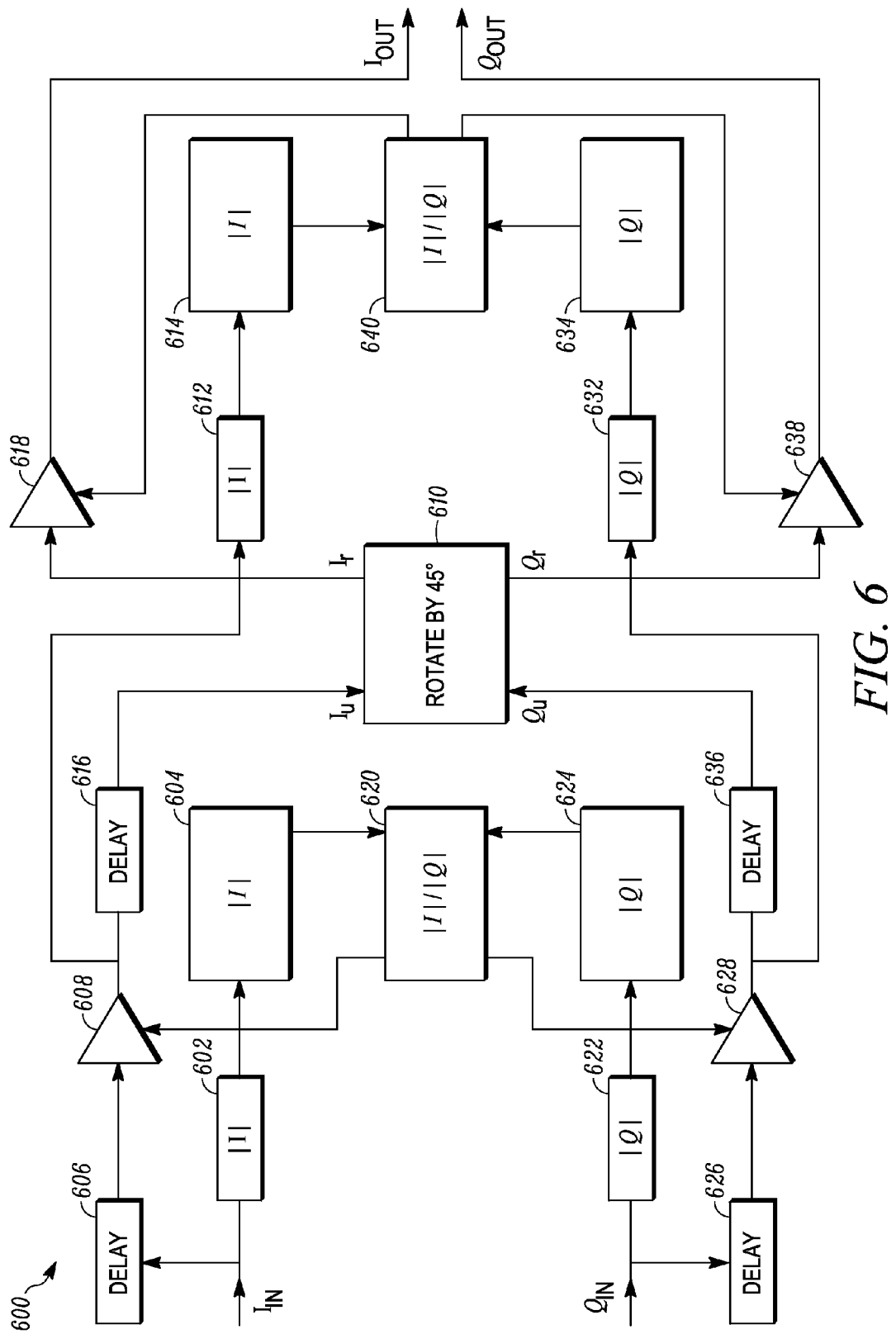
FIG. 6 illustrates an embodiment of the DSP shown in FIG. 5.

FIG. 6 illustrates algorithmic blocks in the DSP 600. The DSP 600 receives the signal from the I and Q paths shown in FIG. 3 and first finds the absolute values of each of the I and Q signals using magnitude blocks 602, 622. The absolute value may be determined by multiplying each signal by its complex conjugate. This involves, for example, taking the signal, extracting the angle of the signal from 0° (e.g., 30°), forming the complex conjugate (e.g., −30°) and multiplying the signal and its complex conjugate together so that the angles cancel out. The magnitudes of the I and Q signals are then averaged using averagers 604, 624. Each averager 604, 624 integrates its input signal over a predetermined time period, e.g., several signal samples, and then divides the integrated signal by the time period. The number of signal samples may be 2 or more dependent on the amount of averaging that is desired to obtain a good estimate for the magnitudes of I and Q. For example, the number of signal samples may be in the hundreds to thousands and is highly dependant on the waveform being processed and the amount of noise that is present. These samples do not need to be taken contiguously but may be taken over the course of time. The ratio of the average values of the I and Q signals is then obtained by divider 620.

The I and Q signals are also provided to delays 606, 626, which delay the I and Q signals until the ratio is obtained by the divider 620. Although delays 606 and 626 are shown in the I and Q signal paths they may not be present. The output from divider 620 controls variable amplifiers 608, 628 after the delays 606, 626. Although variable amplifiers are shown in both the I and Q signal paths, only one variable amplifier may be present and/or controlled by the divider 620. The output from the variable amplifiers 608, 628 is supplied to rotator 610 which rotate the amplified I and Q signals by 45°. A second set of magnitude blocks 612, 632 is used again find the magnitudes of the rotated I and Q signals. These magnitudes are then averaged using a second set of averagers 614, 634. The ratio of the average values of the rotated I and Q signals is then obtained by a second divider 640.

The I and Q signals (or, as shown, delayed I and Q signals from delays 606, 626) are also provided to delays 616, 636, which delay the I and Q signals until the ratio is obtained by the second divider 640. Again although delays 616 and 636 are shown in the I and Q signal paths they may not be present. The output from the second divider 640 controls second variable amplifiers 618, 638 after the delays 616, 636. As above, although second variable amplifiers are shown in both the I and Q signal paths, only one second variable amplifier may be present and/or controlled by the divider 640. The I and Q signals from second variable amplifiers 618, 638 are the corrected, orthogonal I and Q signals.

Figure 7:
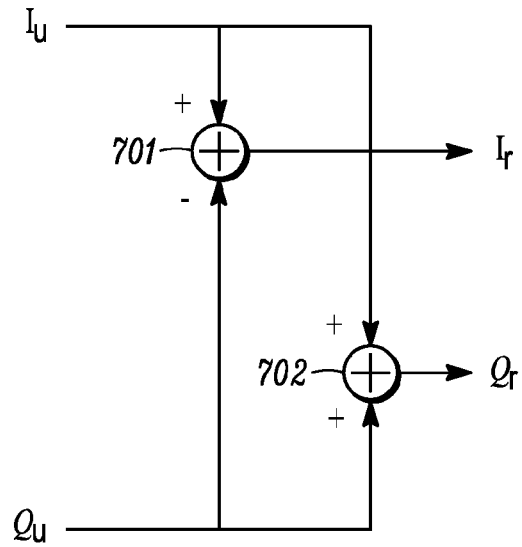
FIG. 7 illustrates an embodiment of a phase rotator shown in FIG. 6.

To perform the 45° rotation, one embodiment of a rotator 700 is shown in FIG. 7. As shown, a pair of adders 701, 702 either adds the real and imaginary components of the signal (adder 702) to form a combined signal or subtracts the imaginary component of the signal from the real component of the signal (adder 701) to form a reduced signal. The resultant signal is shifted 45° from the input signal. Mathematically, $+\pi/4$ can be represented as $(1+i)$ (assuming normalization of the inputs is performed elsewhere). To shift the $I_u$, $Q_u$ signals by $+\pi/4$, the signals are multiplied together:

$$(I_u + i^* Q_u)(1+i) = (I_u - Q_u) + i^*(I_u + Q_u) = I_r + i^* Q_r \qquad (3)$$

Figure 8:
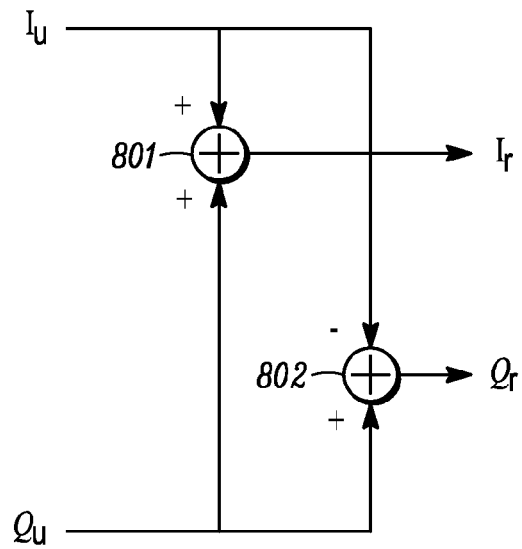
FIG. 8 illustrates an embodiment of a phase rotator shown in FIG. 6.

This representation is shown in FIG. 7. To shift the signal $(I_u + i^* Q_u)$ by $-\pi/4$ (represented as $1-i$) would result in $(I_u + Q_u) - i^*(I_u - Q_u)$, as shown in FIG. 8 (again assuming normalization elsewhere). In this embodiment, the pair of adders 801, 802 of the rotator 800 either adds the real and imaginary components of the signal (adder 801) to form a combined signal or subtracts the imaginary component of the signal from the real component of the signal (adder 802) to form a reduced signal.

This method, in combination with those used to eliminate DC offset and I/Q amplitude imbalance, have been demonstrated by simulation to suppress a −10 dBc sideband to less than −60 dBc. As an example, for this case where the sideband suppression level is only −10 dBc and it is assumed that there is no amplitude imbalance, after the 45 degree rotation is performed, the ratio of the averages of the magnitudes of the I and Q signals will be 1.925 (with the larger of the two in the numerator). After the value of this ratio is used to adjust the amplitudes of I or Q, as described above, it will be observed that the resulting ratio of the averages of the magnitudes of the I and Q signals will now be very close to unity and the resulting sideband suppression level will be less than −60 dBc.

Other approaches used to solve this problem include adjusting the phase of the I and/or Q of the local oscillator or adjusting I or Q gains and cross terms. All-pass amplitude and phase compensation filters have also been used. However, these approaches are computationally intensive, require a large number of extra components, adding to the cost, or are incomplete and require additional computation to achieve the desired results. For example, the phase correction to obtain I and Q orthogonality may be desired using a calculation involving known multiple formulae:

$$X = \sum_{t=1}^{n} I^2,$$

$$Y = \sum_{t=1}^{n} I \cdot Qold,$$

$$R = Y/X,$$

and, where "n" is the number of I samples used in the calculation. In one numerical example where n=2048, the amplitude of I and Q are unity, and the sideband suppression level is −10 dBc, X=256, Y=−147.91 and R=−0.575. However computationally-intensive this is to calculate in the communication device, to obtain the desired sideband suppression performance, an additional factor is to be included that provides amplitude imbalance correction after phase correction is performed. This previously unknown factor is: Qnew_corrected=Qnew−$1/\sqrt{1-R^2}$. After correcting the Q signal samples (Qold) to obtain Qnew, the sideband suppression level may be reduced to less than −60 dBc. As above, the approach is much more computationally-intensive than the approach discussed above in which the correction occurs before and after rotation.

Although the above embodiments have focused on an RF receiver, the compensation techniques described are applicable to applications in other frequency ranges. Such applications include, but are not limited to, ultrasonic receivers such as those used in sonar applications, microwave receivers like those used for radar applications, and low frequency receivers used in medical imaging applications. The compensation technique described may be used in any situation where real signals are to be down-converted to baseband where low sideband signal levels are desired. Transmitters also suffer from I/Q imbalances and thus may employ the compensation technique described (e.g., correcting for gain imbalances between the I and Q signals of the signal to be transmitted during a training session). In addition, if desired, the technique described above can be supplemented using other known techniques.

It will be understood that the terms and expressions used herein have the ordinary meaning as is accorded to such terms and expressions with respect to their corresponding respective areas of inquiry and study except where specific meanings otherwise have been set forth herein. Relational terms such as first and second and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments are implemented as entirely hardware, or entirely software (e.g., a computer program product).

The detailed description is merely exemplary in nature and is not intended to limit the invention defined by the claims or the application and uses of such invention. Furthermore, there is no intention to be bound by any expressed or implied theory presented in the preceding technical field, background, brief summary or the detailed description. As used herein, the word "exemplary" means "serving as an example, instance, or illustration." The terms "substantially", "essentially", "approximately", "about" or any other version thereof, are defined as being close to as understood by one of ordinary skill in the art. Any embodiment described herein as "exemplary" is not necessarily to be construed as preferred or advantageous over other embodiments. A device or structure that is "configured" in a certain way is configured in at least that way, but may also be configured in ways that are not listed. An element "configured to" perform a particular function contains the circuitry and programming to execute the function. All of the embodiments described in this Detailed Description are exemplary embodiments provided to enable persons skilled in the art to make or use the invention and not to limit the scope of the invention, again which is defined by the claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Those skilled in the art will recognize that a wide variety of modifications, alterations, and combinations can be made with respect to the above described embodiments without departing from the spirit and scope of the invention defined by any claims issuing hereinfrom, and that such modifications, alterations, and combinations are to be viewed as being within the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the issuing claims. The invention is defined solely by the issuing claims including any amendments made and all equivalents of those claims.

The invention claimed is:

1. A method of correcting for phase and amplitude errors in a complex signal in an electronic device, the method comprising:
    correcting for gain imbalances between input I and Q signals of the complex signal to create first-stage corrected the I and Q signals;
    rotating the first-stage corrected I and Q signal to create rotated I and Q signals; and
    correcting for gain imbalances between the rotated I and Q signals to create second-stage output I and Q signals.

2. The method of claim 1, further comprising determining the gain imbalances by separately averaging magnitudes of each of the input and rotated I and Q signals over a predetermined time period to determine average magnitudes of each of the input and rotated I and Q signals in both the first-stage and the second-stage.

3. The method of claim 2, wherein the predetermined time period is several cycles.

4. The method of claim 2, wherein the gain imbalance in the first-stage is corrected by adjusting an amplitude of at least one of the input I and Q signals using a ratio of the average magnitudes of the input I and Q signals.

5. The method of claim 4, wherein the corrected I and Q signals are rotated by $e^{\pm i\pi/4}$ by adding real and imaginary components of each of the corrected I and Q signals to form a combined signal and subtracting the imaginary component of the signal from the real component of the signal to form a reduced signal, one of the combined and reduced signals forming the rotated I signal and the other of the combined and reduced signals forming the rotated Q signal.

6. The method of claim 1, wherein the corrected I and Q signals are rotated by $e^{\pm i\pi/4}$ between correcting for the gain imbalances in the first-stage and in the second-stage.

7. The method of claim 1, further comprising generating the complex signal during a training session of the device.

8. The method of claim 1, wherein the complex signal is a received signal whose amplitudes are equal in all four IQ quadrants when averaged over a predetermined time period.

9. The method of claim 1, wherein after initially correcting the gain imbalance in the first-stage and before rotating the corrected I and Q signals, the corrected I and Q signals forms an ellipse in the IQ plane whose major axis is aligned at an angle of $\pm\pi/4$ from the real axis.

10. The method of claim 1, wherein the gain imbalance in the first-stage is corrected by adjusting an amplitude of a delayed version of at least one of the input I and Q signals using a ratio of magnitudes of the input I and Q signals.

11. An electronic device comprising a processor configured to correct for phase and amplitude errors in a complex signal, the processor configured to:
  correct for gain imbalances between input I and Q signals of the complex signal to create first-stage corrected I and Q signals;
  rotate the first-stage corrected I and Q signal to create rotated I and Q signals; and
  correct for gain imbalances between the rotated I and Q signals to create second-stage output I and Q signals.

12. The device of claim 11, wherein the processor is further configured to determine the gain imbalances by separately averaging magnitudes of each of the input and rotated I and Q signals over a predetermined time period to determine average magnitudes of each of the input and rotated I and Q signals in both the first-stage and the second-stage.

13. The device of claim 11, wherein the processor is further configured to correct the gain imbalance in the first-stage by adjusting an amplitude of at least one of the input I and Q signals using a ratio of the average magnitudes of the input I and Q signals.

14. The device of claim 11, wherein the processor is further configured to rotate the corrected I and Q signals by $e^{\pm i\pi/4}$ between correcting for the gain imbalances in the first-stage and in the second-stage.

15. The device of claim 11, further comprising a signal generator configured to generate the complex signal during a training session of the device.

16. The device of claim 11, further comprising an antenna configured to receive the complex signal, the complex signal being a received signal whose amplitudes are equal in all four IQ quadrants when averaged over a predetermined time period.

17. The device of claim 11, wherein the processor comprises algorithmic blocks that include:
  magnitude blocks that determine magnitudes of each of the input I and Q signals;
  averagers that average the magnitudes of the input I and Q signals each by integrating an input signal over a predetermined time period and then dividing the integrated signal by the time period;
  a divider that determines a ratio of the magnitudes of the averaged I and Q signals;
  delays that delay the input I and Q signals until the ratio is obtained by the divider;
  at least one variable amplifier to adjust an amplitude of at least one of the delayed I and Q signals, a gain of the at least one variable amplifier controlled by the ratio, to create the first-stage corrected I and Q signals;
  a rotator that rotates the corrected I and Q signals by 45° to form rotated I and Q signals;
  second magnitude blocks that determine magnitudes of the rotated I and Q signals;
  second averagers that average the magnitudes of the rotated I and Q signals;
  a second divider that determines a ratio of the magnitudes of the rotated I and Q signals;
  second delays that delay the rotated I and Q signals until the ratio is obtained by the second divider; and
  at least one second variable amplifier to adjust an amplitude of at least one of the delayed rotated I and Q signals and whose output is controlled by the ratio obtained from the second divider, to create second-stage output I and Q signals.

18. The device of claim 11, wherein the processor is configured to correct for gain imbalances in the first-stage by adjusting an amplitude of a delayed version of at least one of the input I and Q signals using a ratio of magnitudes of the input I and Q signals.

* * * * *

UNITED STATES PATENT AND TRADEMARK OFFICE
CERTIFICATE OF CORRECTION

PATENT NO. : 8,279,975 B2
APPLICATION NO. : 12/637168
DATED : October 2, 2012
INVENTOR(S) : Rodger W. Caruthers and Aaron S. Madsen It is certified that error appears in the above-identified patent and that said Letters Patent is hereby corrected as shown below:

Title Page:

Item [75], "Inventors," replace "Roger W. Caruthers" with "Rodger W. Caruthers"

In Column 8, Line 52, delete "Qnew-1" and insert -- Qnew•1 --, therefor.

In Column 10, Line 61, in Claim 1, delete "the I" and insert -- I --, therefor.

Signed and Sealed this
Fifth Day of February, 2013

Teresa Stanek Rea
*Acting Director of the United States Patent and Trademark Office*